United States Patent [19]

Keys

[11] Patent Number: 4,993,775
[45] Date of Patent: Feb. 19, 1991

[54] MODULAR WINDOW FRAME SYSTEM FOR AUTOMOTIVE VEHICLES

[75] Inventor: James F. Keys, Port Clinton, Ohio

[73] Assignee: The Standard Products Co., Cleveland, Ohio

[21] Appl. No.: 234,176

[22] Filed: Aug. 19, 1988

[51] Int. Cl.$^5$ .............. B60J 10/00; B60J 10/06; B60J 10/08

[52] U.S. Cl. ................ 296/201; 296/146; 49/374; 49/441

[58] Field of Search .......... 296/201, 200, 202, 146; 49/374, 440, 441, 502

[56] References Cited

U.S. PATENT DOCUMENTS

| | | | |
|---|---|---|---|
| 1,593,005 | 7/1926 | Bailey | 296/200 X |
| 1,622,098 | 3/1927 | Emond | 296/200 |
| 1,629,439 | 5/1927 | Dawson | 296/201 X |
| 1,824,719 | 9/1931 | Hughes | 296/201 |
| 1,886,974 | 11/1932 | Perry | 296/202 |
| 4,409,756 | 10/1983 | Audenino et al. | 49/440 |
| 4,455,785 | 6/1984 | Wahr et al. | 49/488 |
| 4,457,111 | 7/1984 | Koike | 49/441 |
| 4,562,676 | 1/1986 | Kruschwitz | 52/208 |
| 4,653,230 | 3/1987 | Seo et al. | 49/502 |
| 4,688,847 | 8/1987 | Freudenberg | 49/440 X |
| 4,689,916 | 9/1987 | Shimizu | 49/502 X |
| 4,743,062 | 5/1988 | McLaren et al. | 296/146 |
| 4,787,668 | 11/1988 | Kawase et al. | 296/201 X |
| 4,850,636 | 7/1989 | McLaren et al. | 296/146 |

FOREIGN PATENT DOCUMENTS

| | | | |
|---|---|---|---|
| 90947 | 10/1983 | European Pat. Off. | 296/201 |
| 1509976 | 11/1969 | Fed. Rep. of Germany | 49/441 |
| 62-53220 | 3/1987 | Japan | 296/201 |
| 238706 | 8/1925 | United Kingdom | 49/440 |

Primary Examiner—Margaret A. Focarino
Assistant Examiner—Andrew C. Pike
Attorney, Agent, or Firm—Harness, Dickey & Pierce

[57] ABSTRACT

An integrated window frame and glass run channel for a door of an automotive vehicle has an elongated core having opposite ends adapted to be attached within an interior of a vehicle door. The core is generally "U"-shaped in cross section with a pair of legs joined by a web. The web and one of the legs are hollow and receive a structural pillar at each end of the core. An elastomeric cover is bonded to the core and provides a glass run channel adapted to slidably receive edge portions of a window pane.

14 Claims, 4 Drawing Sheets

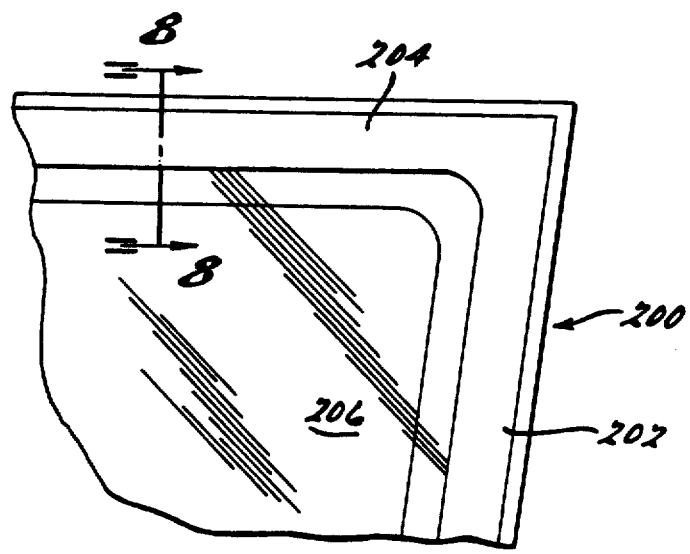
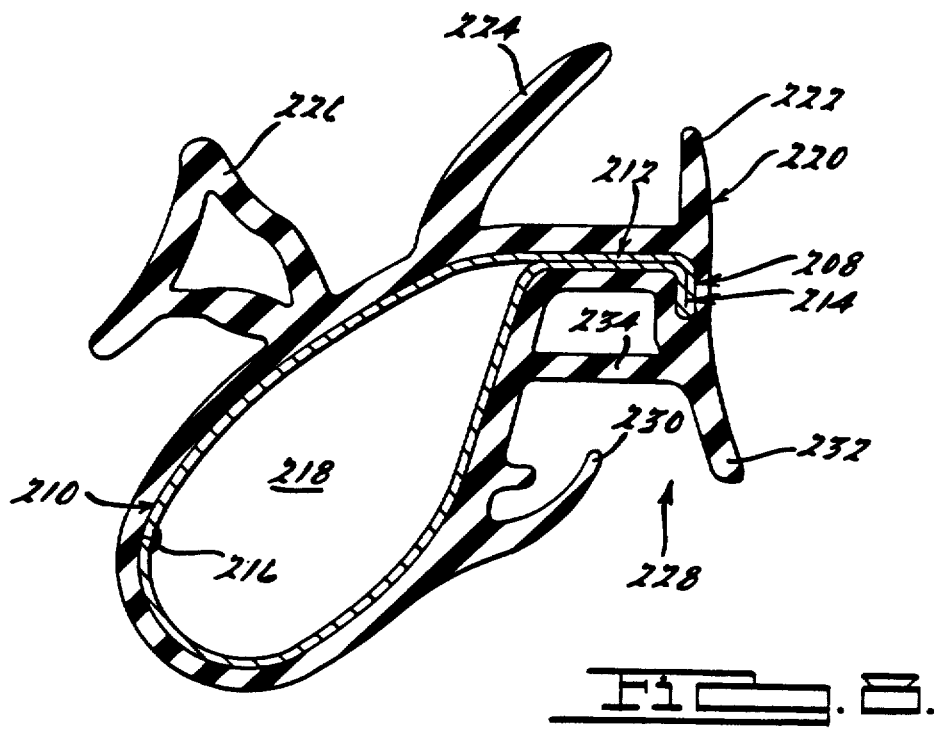

MODULAR WINDOW FRAME SYSTEM FOR AUTOMOTIVE VEHICLES

BACKGROUND AND SUMMARY OF THE INVENTION

The present invention relates generally to automotive body constructions and, more particularly, to automotive panel and window frames. The invention is especially useful as an integral frame and glass run channel for an automobile window.

Automotive vehicles commonly have panels or windows which are retained in frame members. A feature of many automobile doors is a glass windowpane which can be raised and lowered within a window frame. Conventionally, the windowpane follows a generally vertically extending glass run channel defined by a channel-shaped molding within the door frame, and the top edge of the windowpane engages a generally horizontally extending leg of the glass run channel. The glass run channel is normally lined with flocking or other low friction material which allows the glass windowpane to slide therein. The glass run channel also protects the windowpane from damage due to vibration and seals the edges of the windowpane.

In the most common types of movable automotive windowpanes, the frame and glass run channel are two separate components with the glass run channel being secured to the frame. Usually, the edges of the windowpane are centered in the side and top glass run channel legs with the plane of the outer surface of the windowpane noticeably offset from the plane of the outer skin of the automobile body. However, this arrangement detracts from the overall appearance of the automotive vehicle and disrupts the laminar flow of air around the vehicle body, resulting in unnecessary aerodynamic drag and unpleasant noise. Recently, however, there has been increasing interest in the automobile industry for vehicles with windowpanes having outer surfaces which are coplanar or almost coplanar with adjacent vehicle body surfaces. This arrangement is generally referred to as "flush" glass or "semi-flush" glass and is desirable for enhancing vehicle appearance and laminar air flow thereby reducing aerodynamic drag and wind noise.

Several patents disclose the feature of providing a window which is flush or nearly flush with adjacent vehicle body surfaces. Examples of such patents include: U.S. Pat. No. 4,409,756, Oct. 18, 1983 to Audenino, et al.; U.S. Pat. No. 4,562,676, Jan. 7, 1986 to Kruschwitz; U.S. Pat. No. 4,455,785, June 26, 1984 to Wahr, et al.; and U.S. Pat. No. 4,457,111, July 3, 1984 to Koike. None of these patents, however, disclose a unitary window frame, body seal, and glass run channel system.

However, there remains a need in the automotive industry for improved sealing structures for movable windows. In particular, there remains a need for improved glass run channels which permit the windowpane to lie flush or approximately flush with the windowsill without detracting from the appearance or quiet operation of the window. Also, it would be desirable to provide a window frame with an integral glass run channel and body seal.

There also remains a need for new frame members for panels or windowpanes, fixed or movable, having improved sealing elements and which can be economically manufactured.

Accordingly, it is an object of the present invention to provide the art with a new and improved vehicle integral frame. The present invention can be used to well secure a windowpane in a glass run channel with minimal vibration of the windowpane. Further, the present invention provides improved sealing of a frame structural member as well as a glass run channel therein. Further the present invention provides a one-piece window frame having an integral glass run channel for providing a windowpane with a flush glass appearance to be secured to an automobile door.

One embodiment of this invention provides a new and improved frame and glass run channel including a frame member having an upper portion shaped to extend about the perimeter of a vehicle window and a pair of lower end portions comprising a pair of support legs adapted to be secured in a interior of the vehicle door. The frame member has a metal core covered with an elastomeric skin. The metal core is generally U-shaped in crosssection with two legs joined by a web to form a glass run channel. The web and one leg are hollow to provide a cavity which receives a support pillar in each lower end portion. The other leg has minimal thickness for aligning the windowpane in the glass run channel with flush glass appearance characteristics. Sealing means is provided for sealing the frame member with respect to the associated door frame of a vehicle. Further understanding of the present invention will become apparent to one skilled in the art from the following description and claims taken in conjunction with the accompanying drawings.

BRIEF DESCRIPTION OF THE DRAWINGS

FIG. 7 is a side elevation similar to FIG. 2 but broken away and of an alternative embodiment of the present invention.

FIG. 8 is a cross-sectional view taken along line 8—8 in FIG. 7.

DESCRIPTION OF THE INVENTION

Figure 1:
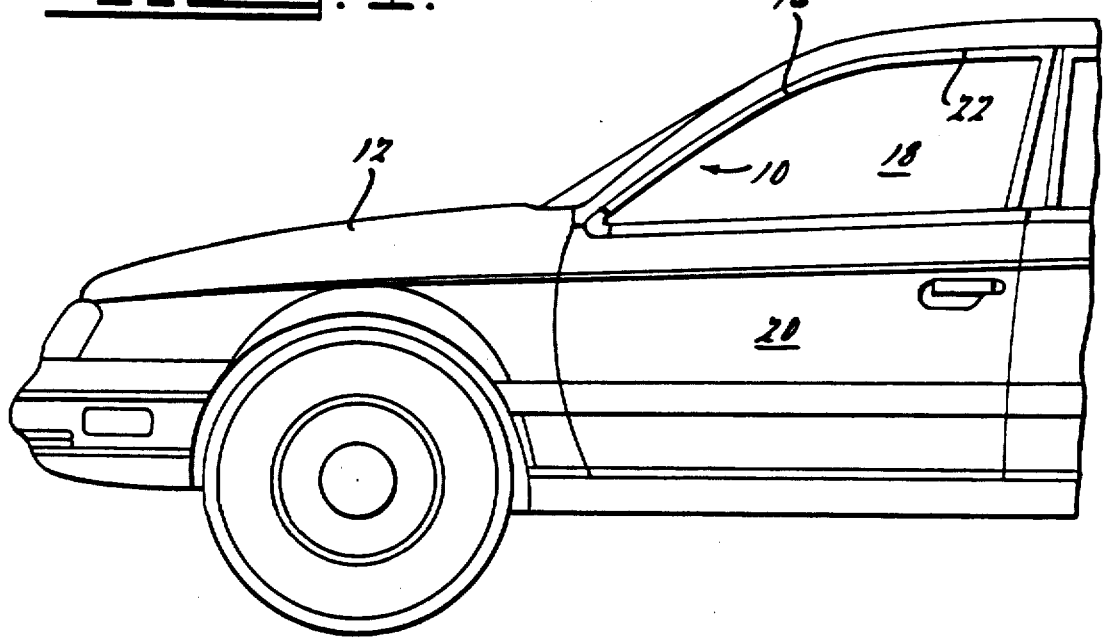
FIG. 1 is a side elevation, broken away, of an automobile with an integrated window frame and a glass run channel embodiment of the present invention.

The following description of the present invention is cast generally in lines of an integrated window frame and glass run channel system for the door of an automotive vehicle. It will be appreciated, however, that this invention can broadly be used as a panel or glass frame generally. Referring to FIGS. 1-4, a preferred embodiment of the present invention is an integrated window frame and glass run channel system for a door of an automotive vehicle as illustrated and indicated generally by the numeral 10. FIG. 1 illustrates system 10 installed on an automotive vehicle 12. As can best be seen in FIG. 2, system 10 is an elongated structure with an upper portion 14 extending about sides and top perimeter edge portion 16 of windowpane 18. System 10 is positioned onto a door 20 of automotive vehicle 12 having lowerable and raisable windowpane 18. Upper portion 14 of system 10 fits within door frame 22 when door 20 is in a closed position as illustrated in FIG. 1.

Figure 2:
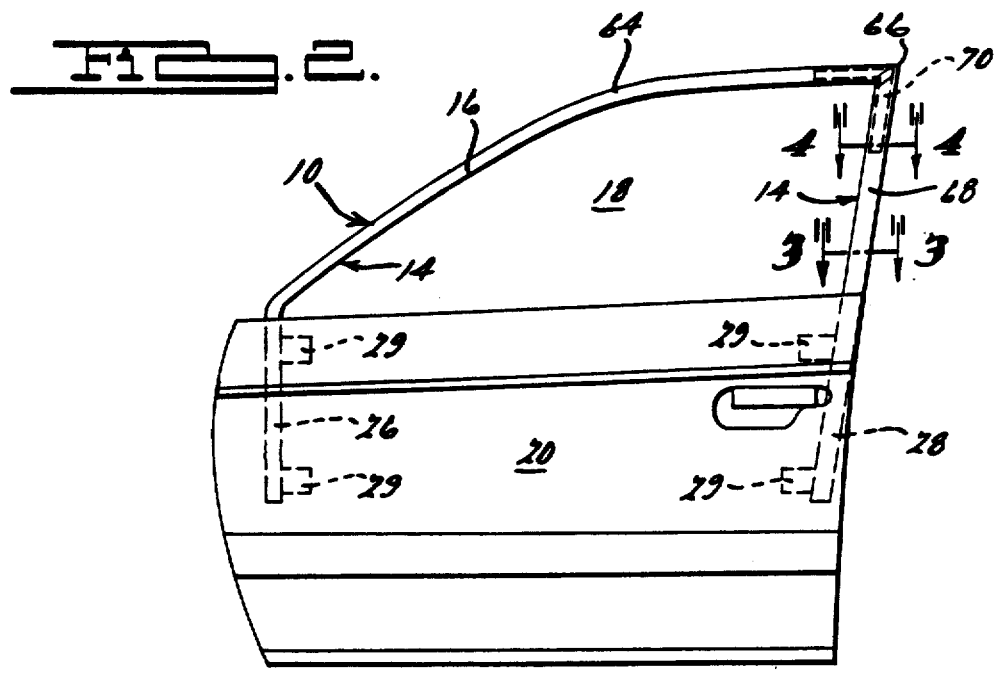
FIG. 2 is a side elevation of the automotive door assembly shown in FIG. 1.

As is best shown in FIG. 2, both end portions of system 10 comprise a lower portion thereof and provide a pair of support legs 26 and 28. Each of support legs 26 and 28 are positioned between an inner and outer door panels and have brackets 29. Brackets 29 are riveted or otherwise attached to legs 26 and 28 and are secured by bolting, welding or the like to the inner or outer door panel or crash bar.

Figure 3:
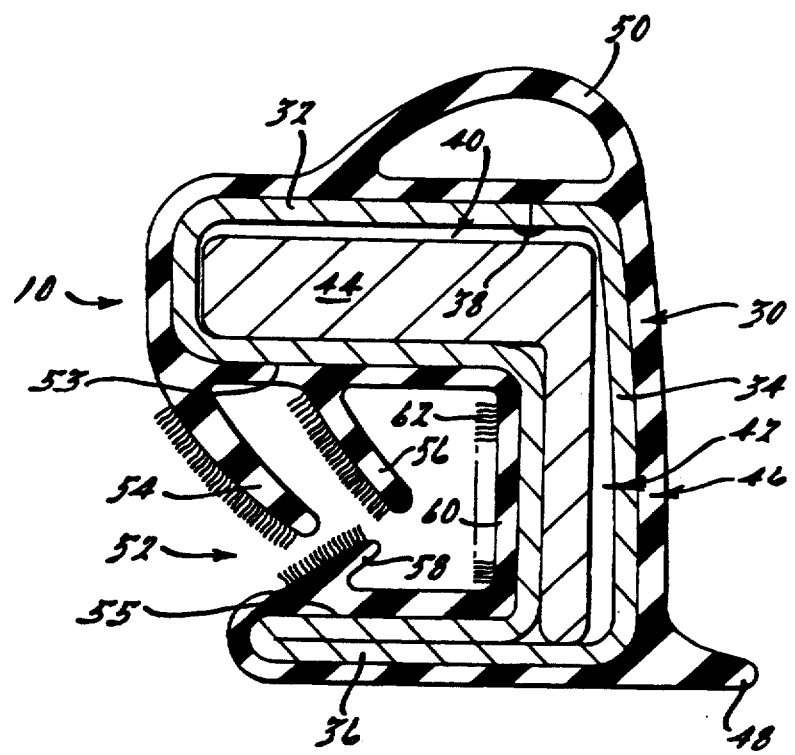
FIG. 3 is a cross-sectional view taken along line 3—3 in FIG. 2.

Now referring to FIG. 3, the structure of support leg 28 of system 10 is well illustrated. It will be appreciated that the structure of leg 26 is analogous to that of leg 28. Thus, leg 28 has a generally U-shaped core 30 having a hollow leg 32, web 34 and leg 36. Core 30 is preferably comprised of galvanized steel, stainless steel, aluminum, or the like and can be roll-formed into the desired "U"-shape and welded or roll locked at 38 to provide spaced apart walls to form a leg cavity 40 and a web cavity 42. Alternatively, core 30 can be a generally solid extruded aluminum profile produced by a powder metallurgy process. Leg 36 is intended to be on the outboard side of the vehicle and is formed with little or no cavity so that windowpane 18 can be offset toward the outboard side of the vehicle. The leg 36 has abutting walls to thereby offset the glass run channel from a longitudinal axis of the system a distance such that an outer surface of the glass windowpane in the channel will be substantially coplanar with an adjacent surface of an associated vehicle body. Disposed within cavities 40 and 42 is pillar 44 which is preferably "L"-shaped in crosssection. Pillar 44 extends from about an end of leg 28 upwardly and provides structural integrity to system 10.

Extending completely and continuously around an outer surface of core 30 and bonded thereto is an elastomeric cover 46. Elastomeric cover 46 is preferably coextruded over core 30 and can comprise any suitable elastomeric material such as is conventional in the art. Elastomeric cover 46 has a rib-like primary body seal 48 extending laterally therefrom and adapted to provide sealing engagement between system 10 and the adjacent door frame 22. In addition, elastomeric cover 46 has a hollow tubular secondary body seal 50 to provide secondary sealing engagement between system 10 and the adjacent door frame 22.

System 10 has a generally "U"-shaped crosssection to provide glass run channel 52. Elastomeric cover 46 has one or more of glass sealing ribs 54 and 56 extending into channel 52 from one wall 53 thereof and a shorter rib 58 extending into channel 52 from another wall 55 thereof. The windowpane-contacting surfaces of ribs 54, 56 and 58 as well as web portion 60 of glass run channel 52 can have flocking 62 or other friction reducing material thereon to facilitate the sliding action of the windowpane.

Figure 4:
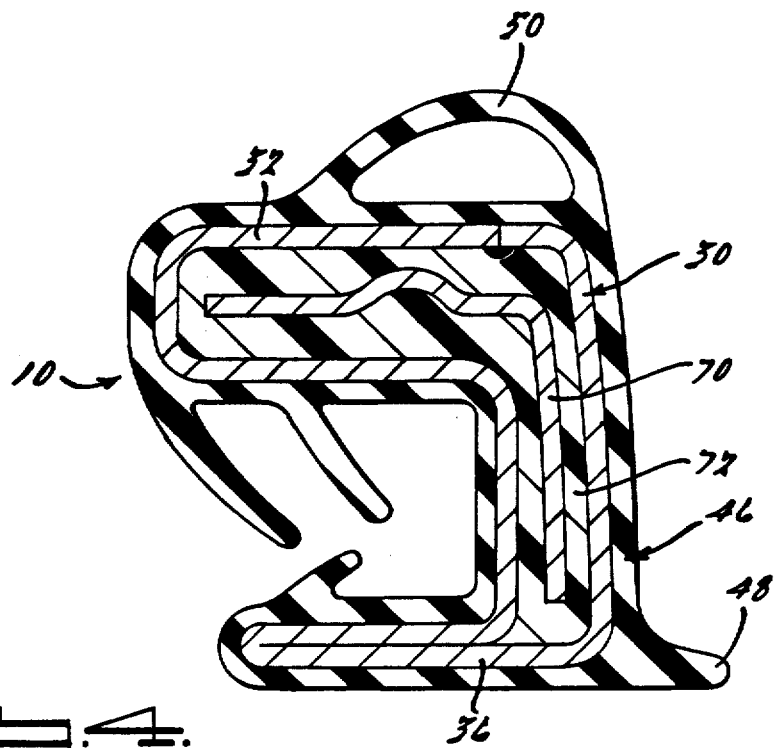
FIG. 4 is a cross-sectional view taken along line 4—4 in FIG. 2.

Pillar 28 extends upwardly into upper portion 14 of system 10 but pillar 26 may not extend into upper portion 14. Thus, a generally horizontal leg 64 of system 10 comprises core 30 with elastomeric cover 46 but has sufficient structural integrity without internal support within cavities 40 and 42. The structure of corner 66 is shown in FIGS. 2 and 4. The joint of generally horizontal leg 64 and vertical leg 68 at corner 66 is strengthened by means of an "L"-shaped corner insert bracket 70.

Adhesive material 72 bonds legs 64 and 68 to bracket 70 for additional structural integrity.

The integrated window frame and flush glass run system 10 of the present invention can be made in accordance with the following procedure. A strip of double side electrogalvanized steel, painted one side, is first buffed to prepare edges for welding and then roll formed and welded, or roll locked into the cross-sectional configuration of core 30 shown in the figures. Elastomeric cover 46 is then extruded onto core 30, bonded thereto and cured. The flock 62 is then adhesively applied and cured in the areas shown in the figures. Lengths of core 30 with elastomeric cover 46 are sized and cut.

The lengths are then bent into the desired shape so as to extend around the window perimeter in accordance with the following operation. Flexible internal supports or snakes are inserted into the hollow cavities 40 and 42 of core 30 which is then stretch bent. The snakes are then removed and the lengths are cut to exact dimensions. The pillars are then cut to length and the ends at corner 66 are mitered. Bracket attachment holes are drilled, structural adhesive injection holes are drilled and the ends are deburred. Structural adhesive is then injected into the ends of the extrusion. A preheated corner insert bracket 70 is loaded into a corner mold and the ends of the extrusions are loaded into the mold by sliding them onto the insert. The mold is then closed and elastomeric material is injection molded to form the corner structure. The structural adhesive and rubber are simultaneously cured in the mold with heat.

Finally, the pillar reinforcements are inserted into the pillar sections, brackets 29 are attached and popriveted into a sandwich and structural adhesive is injected into the core interior through the predrilled holes at any high stress areas requiring reinforcement. The structural adhesive is then post cured with heat to provide a finished integrated window frame and flush glass run system.

Figure 5:
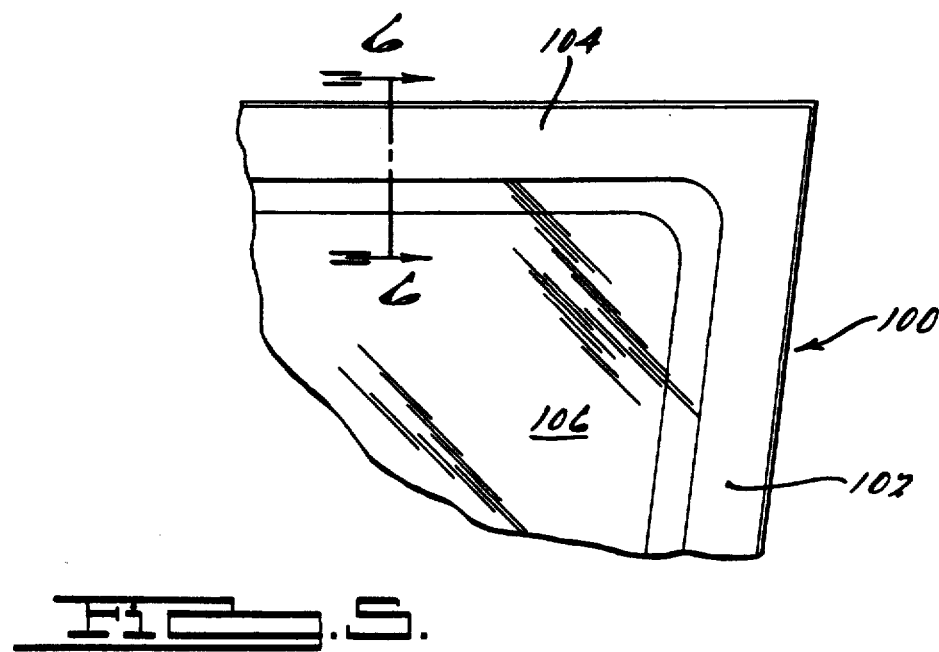
FIG. 5 is a side elevation similar to FIG. 2 but broken away and of an alternative embodiment of the present invention.
Figure 6:
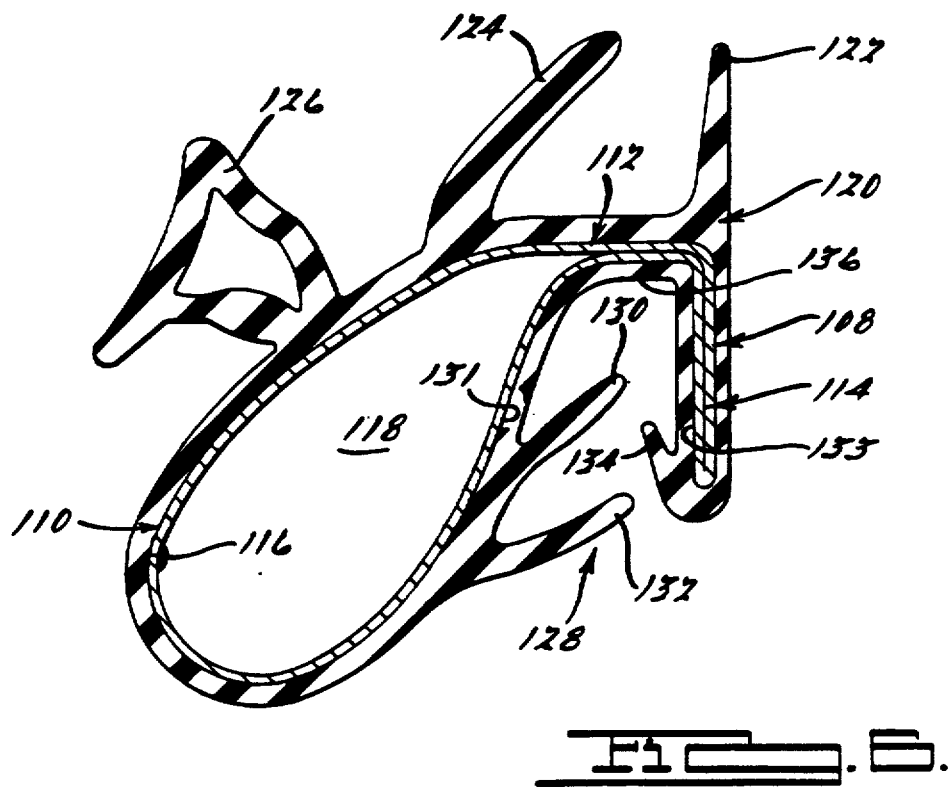
FIG. 6 is a cross-sectional view taken along line 6—6 in FIG. 5.

Now referring to FIGS. 5 and 6, an alternative preferred embodiment of the present invention is illustrated and indicated generally by the numeral 100. Integrated window frame and glass run channel system 100 has a vertical support leg 102 and a horizontal leg 104. Disposed within system 100 is a glass windowpane 106. The structure of horizontal leg 104 and vertical leg 102 are analogous and are well illustrated in FIG. 6. Thus, leg 104 has a generally "U"-shaped core 108 having a teardrop-shaped hollow interior portion 110, web portion 112 and leg portion 114. Core 108 is preferably roll-formed of galvanized steel, stainless steel, aluminum or the like and can be welded as at 116. Leg 114 is intended to be on the outboard side of the vehicle and is formed with little or no cavity so that windowpane 106 can be offset towards the outboard side of the vehicle. Elastomeric cover 120 is preferably coextruded over the outer surface of the core 108 and can comprise any suitable elastomeric material such as is conventional in the art. Elastomeric cover 120 has a rib-like primary body seal 122 extending laterally therefrom and adapted to provide sealing engagement between system 100 and an adjacent door frame. A secondary body seal 124 is provided to provide secondary sealing engagement between system 100 and an adjacent door frame.

Secondary seal or auxiliary seal 124 is preferably made of a sponge rubber material.

In addition, elastomeric cover 120 can carry a door weatherstrip 126 which is preferably made of a sponge material and can be formed unitary with elastomeric cover 120 or separately therefrom.

System 100 has a generally "U"-shaped crosssection portion to provide a glass run channel 128. Elastomeric cover 120 has a pair of glass sealing ribs 130 and 132 which extend into channel 128 from one wall 131 thereof and a shorter glass sealing rib 134 extending into channel 128 from another wall 133 thereof. The glass windowpane contacting surfaces of ribs 130, 132, and 134 as well as web portion 136 and glass run channel 128 can have flocking or other low friction coatings such as polyurethane or TEFLON thereon to facilitate the sliding action of the window therein as is conventional in the art.

System 100 can be made generally following the procedures set forth above with regard to system 10. It is contemplated that structural reinforcement such as structural polymers, adhesives, concrete, or suitably shaped metal pillars will be employed where necessary within cavity 118 for structural strength.

Now referring to FIGS. 7 and 8 yet another alternative preferred embodiment of the present invention is illustrated and indicated generally by the numeral 200. System 200 is similar in construction to system 100 and has a vertical leg 202 and a horizontal leg 204 which frame a glass windowpane 206. As is best shown in FIG. 8 system 200 has a generally "U"-shaped core 208 having an enclosed hollow interior leg portion 210, web 212 and leg 214. Core 208 is preferably comprised of galvanized steel, stainless steel, aluminum, or the like and welded as at 216 into final form. Leg 214 is intended to be on the outboard side of the vehicle and is formed with little or no cavity so that windowpane 206 can be offset toward the outboard side of the vehicle. Disposed within cavity 218 is structural material as in the earlier embodiments where such is necessary for increased structural strength.

Extending completely and continuously around an outer surface of core 208 is an elastomeric cover 220. Elastomeric cover 220 is preferably coextruded over core 208 and can comprise any suitable elastomeric material such as is conventional in the art. Elastomeric cover 220 has a rib-like primary or seam seal 222 adapted to provide sealing engagement between system 200 and an adjacent door frame. In addition elastomeric cover 222 has a secondary or auxiliary seal 224 and a door weatherstrip 226.

System 200 has a generally "U"-shaped crosssection to provide a glass run channel 228. Elastomeric cover 220 has a glass sealing finger 230 and leg 232 which cooperate with web 234 to provide the glass run channel. Glass run channel 228 can have flocking or other low friction coating on surfaces thereof coming in contact with a sliding window.

A method of making system 200 is analogous to that set forth with respect to systems 10 and 100.

While the above description sets forth a preferred embodiment of the present invention, it will be apparent to those skilled in the art that the present invention is subject to modification and variation within the scope of the following claims. For example, the frame member can be used in conjunction with panels such as trunk lid panels, hatchback panels, fixed windows, moon-roofs and the like as well as movable windows.

What is claimed is:

1. A one-piece window frame and glass run channel system adapted to be secured to a door of an automotive vehicle comprising:
    an elongated core having two end portions, each of said end portions adapted to be secured to an interior of the door to provide a core on the door and said core being generally "U"-shaped in crosssection with first and second legs joined by a web, one of said legs and said web having a cavity therein;
    an elastomeric cover permanently bonded to and surrounding said core, said elastomeric cover having a glass run channel adapted to slidably receive edge portions of a windowpane; and
    an elongated structural pillar extending into at least one cavity of said end portions of said elongated core to provide rigidity to said elongated core.

2. A system as in claim 1 wherein said pillar is "L"-shaped in cross-section.

3. A system according to claim 2 wherein an upper portion of said system has sealing means for sealing said upper portion with respect to an associated door frame.

4. A system according to claim 3 wherein said sealing means is an elastomeric rib extending laterally from said elastomeric cover.

5. A system according to claim 3 wherein said sealing means is a tubular gasket.

6. A system according to claim 3 wherein said sealing means includes, in crosssection, both a tubular shaped gasket and a rib.

7. A system according to claim 6 wherein said glass run channel has ribs extending inwardly of said channel adapted to sealingly engage said glass edge portions.

8. A system according to claim 7 wherein said first leg of said core has spaced-apart walls to provide a cavity therebetween and said second leg has abutting walls to thereby offset said glass run channel from a longitudinal axis of said system a distance such that an outer surface of said windowpane in said channel will be substantially coplanar with an adjacent surface of an associated vehicle body.

9. A one-piece frame for a panel adapted to be secured to an automotive vehicle comprising:
    a roll-formed elongated metallic core member having an outer surface and an enclosed hollow interior portion said core is adapted to be coupled with an automotive vehicle;
    an elastomeric cover co-extruded continuously over said outer surface of said core member and completely and continuously surrounding said outer surface; and
    said elastomeric cover having a "U"-shaped portion for receiving an edge of a panel.

10. A frame as in claim 9 wherein said panel is a glass window panel.

11. A frame as in claim 9 wherein said cover has sealing ribs extending therefrom.

12. A one-piece structural frame for an automotive panel comprising:
    a roll-formed elongated metallic core member having an outer surface and a hollow enclosed interior portion, said core being adapted to be coupled with an automotive vehicle;
    a reinforcing material located within selected portions of said hollow enclosed interior portion; and
    an elastomeric material completely and continuously covering the outer surface of said core member.

13. A frame as in claim 12 wherein said core defines a channel for receiving an edge of a panel.

14. A frame as in claim 13 wherein said elastomeric material has sealing ribs extending therefrom.

* * * * *

UNITED STATES PATENT AND TRADEMARK OFFICE
CERTIFICATE OF CORRECTION

PATENT NO. : 4,993,775

DATED : February 19, 1991

INVENTOR(S) : James F. Keys

It is certified that error appears in the above-identified patent and that said Letters Patent is hereby corrected as shown below:

Column 2, line 19, "a" should be --an--

Column 2, line 22, "crosssection" should be --cross section--

Column 3, line 11, "panels" should be --panel--

Column 3, line 35, "crosssection" should be --cross section--

Column 3, line 50, "crosssection" should be --cross section--

Column 5, line 3, "crosssection" should be --cross section--

Column 5, line 48, "crosssection" should be --cross section--

Column 6, lines 4-5, claim 1, "crosssection" should be --cross section--

Column 6, line 25, claim 6, "crosssection" should be --cross section--

Signed and Sealed this

Twenty-third Day of February, 1993

Attest:

STEPHEN G. KUNIN

*Attesting Officer*  *Acting Commissioner of Patents and Trademarks*